United States Patent [19]
Lasch, Jr.

[11] 3,796,466
[45] Mar. 12, 1974

[54] GROOVED FLUID BEARING BAR

[75] Inventor: Cecil A. Lasch, Jr., Los Altos, Calif.

[73] Assignee: Industrial Modular Systems Corporation, Santa Clara, Calif.

[22] Filed: June 10, 1971

[21] Appl. No.: 151,935

Related U.S. Application Data

[62] Division of Ser. No. 852,216, Aug. 22, 1969, Pat. No. 3,631,758.

[52] U.S. Cl. .................................................. 302/29
[51] Int. Cl. ........................................... B65g 53/04
[58] Field of Search ............ 302/2, 29, 31; 415/215

[56] References Cited
UNITED STATES PATENTS
2,480,807   8/1949   DeVlieg ........................ 415/215 X

*Primary Examiner*—Richard E. Aegerter
*Assistant Examiner*—H. S. Lane

[57] ABSTRACT

Process for forming a series of spaced, generally uniform, curved grooves of tapered configuration in a surface of a bar intended for use in a fluid bearing track structure or the like, and the grooved bar which results from utilizing such process. Material is cut or ground from the bar surface by a rotary cutter or cylindrical grinder, the axis of rotation of which is set at compound angles and is inclined in the direction of movement of the bar and also in a direction transverse to such direction of movement. Each of the curved grooves progressively decreases in depth and width from one end thereof towards its other end to define a nozzle configuration. In the preferred embodiment illustrated, the bar being grooved is moved continuously beneath a continuously rotating cutter.

9 Claims, 11 Drawing Figures

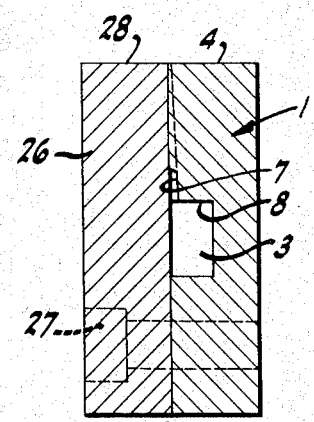
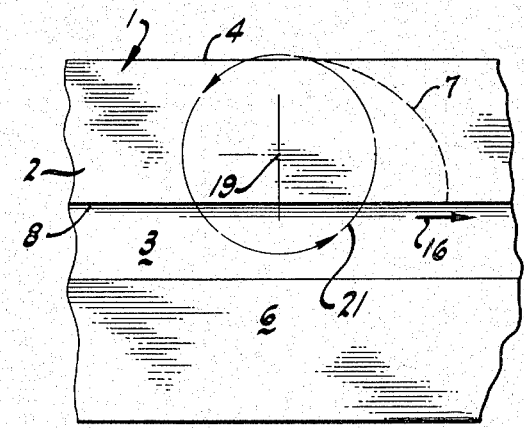
FIG.11
FIG.7
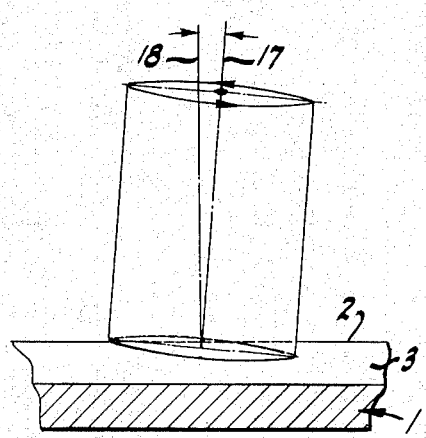
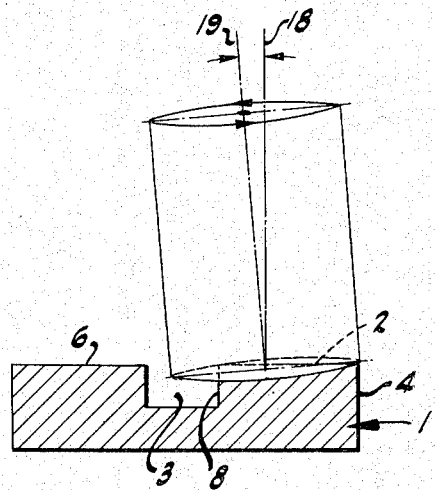
FIG.8
FIG.9
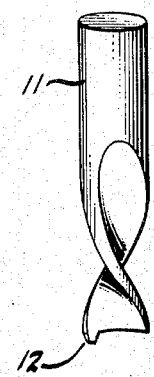
FIG.10

GROOVED FLUID BEARING BAR

This application is a division of my former Application Ser. No. 852,216 filed Aug. 22, 1969, now U.S. Pat. No. 3,631,758, issued Jan. 4, 1972.

The grooved bar formed by the subject process is well suited for use in article handling apparatus of varying types in which a fluid, such as air, is employed to support and transport an article being moved from one location towards another. Specifically, the process disclosed herein is well suited for producing grooved bars to be incorporated into article handling apparatus and procedures of the type described in Lasch, Jr. et al, application Ser. No. 779,033, filed Nov. 26, 1968, entitled "Apparatus and Method for Handling and Treating Articles."

BACKGROUND OF THE INVENTION

1. Field of the Invention

This invention relates generally to the field of forming grooved bars usable as components of track structures employed in fluid bearing transport systems. More particularly, this invention relates to the field of fluid bearing bars having grooves therein through which a fluid bearing medium is passable for supporting and moving articles along a fluid bearing track structure of which such bars are a part, and to a simplified, improved and inexpensive process for forming grooves in such bars. Although the subject process is particularly effective in conjunction with the manufacture of grooved bars for use in fluid bearing systems such as disclosed in the aforementioned application, the utility of this invention is not limited to such purpose and its utility extends to other areas as well.

2. Description of the Prior Art

Fluid bearing track structures of various types have been generally known in the art heretofore, and the following patents disclose track structures which are exemplary of the prior art: Hazel U.S. Pat. No. 2,778,691, dated Jan. 22, 1957; Cole U.S. Pat. No. 3,103,388, dated Sept. 10, 1963; and Coville U.S. Pat. No. 3,318,640, dated May 9, 1967. Prior known fluid bearing track structures of the type exemplified by these patents, however, do not contemplate or disclose the improved grooved bar construction disclosed herein or the simplified and inexpensive process of grooving such bars similarly described herein.

So far as is known, grooved bars of the construction disclosed herein have been unknown prior to this invention or to the invention embodied in the related features described in the aforementioned application. Specifically, fluid bearing bars having a series of curved grooves in a surface thereof, each of which is formed generally with a tapered nozzle configuration defined by one end which is larger than its opposite end, have been unknown prior to this invention. Similarly, the numerous advantageous features of the process of this invention have been unknown in the art to which this invention pertains.

SUMMARY OF THE INVENTION

The present relates to an improved process for forming a series of spaced, generally uniform curved grooves in a surface of an article, such as a rigid plastic or metal bar intended for use as a component in a fluid bearing track structure. More particularly, this invention relates to a grooved bar in which a series of curved grooves are formed in a bar surface, each of which is of varying dimension from one end thereof towards the other and to a process for grooving such surface.

Still more particularly, this invention relates to a grooved bar having a series of grooves therein each of which varies in both width and depth from one edge of a grooved surface to the other edge thereof, whereby each such groove is imparted with a nozzle shaped configuration. In that connection, the invention specifically relates to an improved and simplified process for grooving a series of bars in which a rotary cutter or grinder is utilized to form individual tapered grooves during a portion of each revolution of the cutter.

During such utilization of the grooving tool, the bar being grooved is advanced in conjunction with rotation of the cutter so that successive grooves are formed in the surface in response to such bar movement. In the illustrated embodiment, the bar being grooved is moved continuously beneath a continuously rotating cutter. However, if a grinding tool is utilized, advancement of the bar is incremental in conjunction with formation of each groove. The grooving tool is rotated about an axis which is inclined in two directions relative to the vertical so that engagement of the tool with the bar surface during only a portion of each revolution thereof is insured. Thus grooves are formed to extend in only one uniform orientation along the length of the bar surface desired to be grooved.

In the apparatus schematically illustrated herein, a rotary cutter, which may form part of a conventional milling machine, is utilized. Such cutter includes an offset cutting point or edge of predetermined configuration chosen in accordance with the configuration of the groove cross-section desired for a given bar. In such arrangement, the bar being grooved is mounted in the milling machine and advanced along a predetermined linear path beneath the rotating cutter so that the cutter may perform its intended function as the bar moves therealong.

In the specific bar embodiment illustrated herein by way of example, each bar being grooved includes a longitudinal channel which bisects the bar into two generally planar sections, one of which lies along each side of the channel. Such channel forms a fluid passage to be operatively connected with a plenum or like chamber in a fluid bearing track structure. The grooves formed in the bar are located in communication with such channel and extend from one edge of the surface defined by the channel to an opposite edge of the surface from which the grooves exit at a predetermined angle. Such exit angle may be controlled within precise limits by the grooving process disclosed herein by proper orientation of the axis of the rotary cutter relative to the axis of direction of movement of the bar therebeneath. Groove exit angles may be selected, as may groove depth variations and the like, so that grooved bars tailored to meet specific needs may be readily and inexpensively formed on available milling machinery.

From the foregoing, it should be understood that objects of this invention include: the provision of an improved process for forming a series of curved generally uniform grooves in a surface of a bar; the provision of an improved grooved bar in which grooves of varying dimension are formed in sequence along the length of a surface being grooved; the provision of an improved fluid bearing bar structure having curved nozzle shaped grooves in a surface thereof; the provision of an improved and simplified process for forming a series of spaced curved grooves in a bar surface by removing material of such bar from such surface in accordance with a predetermined program; the provision of an improved fluid bearing bar structure in which individual grooves are formed having decreasing depths and widths from one end of each groove towards the other; the provision of a fluid bearing bar structure having curved grooves therein which are formed generally as segments of an ellipse; the provision of a bar structure in which the exit angles of the grooves may be selectively varied in accordance with a predetermined manufacturing plan; and the provision of a bar grooving process in which the groove exit angle may be modified within wide limits to meet specific needs.

These and other objects of this invention will become apparent from a study of the following disclosure in which reference is directed to the attached drawings.

DESCRIPTION OF THE DRAWINGS

FIG. 7 is a generally schematic plan view illustrating the path traced by the cutting edge of a rotary cutter in relationship to the bar moving therebeneath.

FIGS. 8 and 9 are generally schematic views illustrating the respective angles of inclination of the axis of rotation of the rotary cutter relative to the axis of direction of movement of the bar being grooved.

FIG. 10 is an isometric view of one embodiment of a rotary cutter which may be employed in the subject process.

FIG. 11 is a sectional view illustrating one examplary utilization of a grooved bar formed by the subject process in conjunction with cooperable components in a fluid bearing track structure.

DESCRIPTION OF THE PREFERRED EMBODIMENTS

Figure 1:
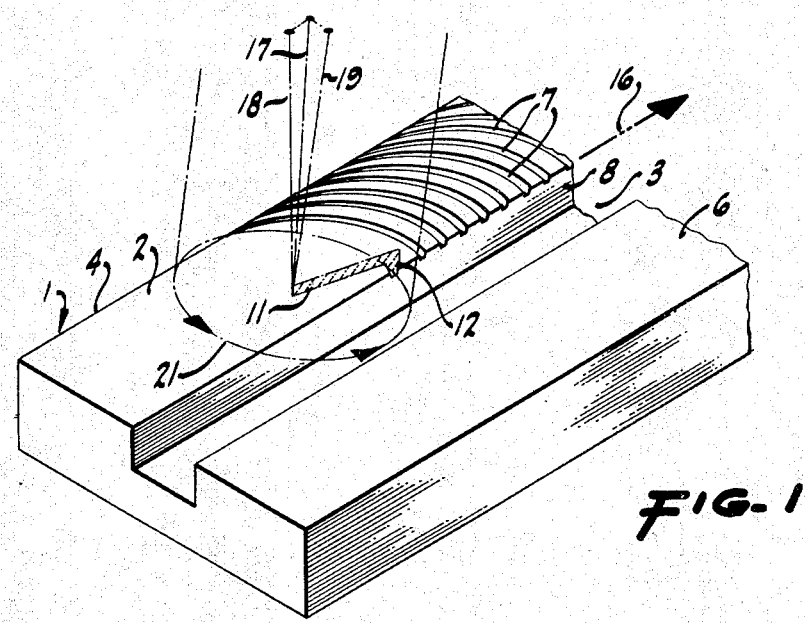
FIG. 1 is an isometric view showing a portion of a bar being grooved by the subject process.

As noted previously, this invention has as an important aspect thereof the production of grooved bars, particularly bars well suited for use in fluid bearing track structures designed for the handling and transport of various and varied articles, such as, by way of example, silicon and like wafers of the type widely used in the electronics industry. In that connection, reference is directed to the aforementioned application for further descriptions and exemplary showings of uses for such grooved bars.

It should be noted that this invention is utilizable in conjunction with bars of various configurations and materials, such as metals, rigid plastics, or refractory mats, suitable for use in a given fluid bearing track structure installation. The configuration of such bars may vary to meet particular needs but, in general, such bars are generally rectangular in cross-section, frequently formed with longitudinal channels therein which provide a main fluid flow passage extending along the length of the bar in communication with the tributary grooves which exit at one edge of the bar over which articles being handled and transported pass when such bar is positioned in a fluid bearing track structure.

Before describing details of the preferred procedure for grooving a bar surface as disclosed herein, reference is directed to FIGS. 1 through 6 which illustrate the novel configuration of the grooves formed as fluid passages through which article supporting and transporting fluid passes when such bar is utilized in a fluid bearing track structure. The subject bar, generally designated 1, includes a generally planar surface 2 in which grooves are to be formed for the stated purpose. In the embodiment illustrated, one edge of surface 2 is defined by a longitudinally extending, main fluid flow channel 3 with its opposite edge being defined by an edge surface 4 of the bar. As best noted from FIG. 1, the bar is generally rectangular in cross-section with channel 3 altering its regular cross-section in the area noted.

In the embodiment illustrated, a second generally planar surface 6 lies on the opposite side of channel 3. Surface 6 is generally coplanar with surface 2 in which the grooves are formed for the purpose to be described.

Figure 2:
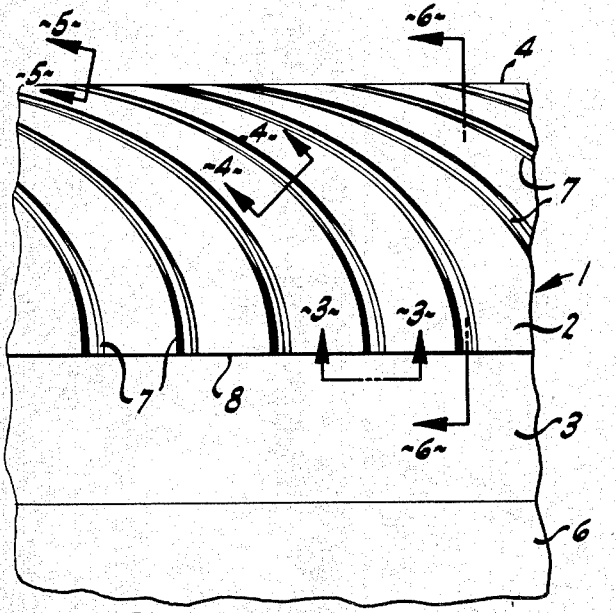
FIG. 2 is a plan view of a portion of a grooved bar illustrating details of the construction of the individual grooves formed therein.
Figure 6:
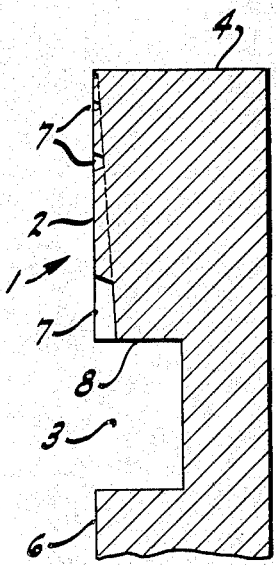
FIGS. 3, 4, 5 and 6 are partial sectional views through the grooved bar taken in the planes of lines 3—3, 4—4, 5—5 and 6—6 respectively, of FIG. 2.

As seen from FIGS. 1 and 2, surface 2 is formed with a series of spaced, generally uniform grooves 7 each of which extends across surface 2 from edge 8 to channel 3 to the aforementioned edge surface 4 of the bar. Each groove opens onto edge surface 4 at a predetermined exit angle selected in accordance with the nature of the articles to be supported by fluid above such surface.

Figures 3, 4, 5:
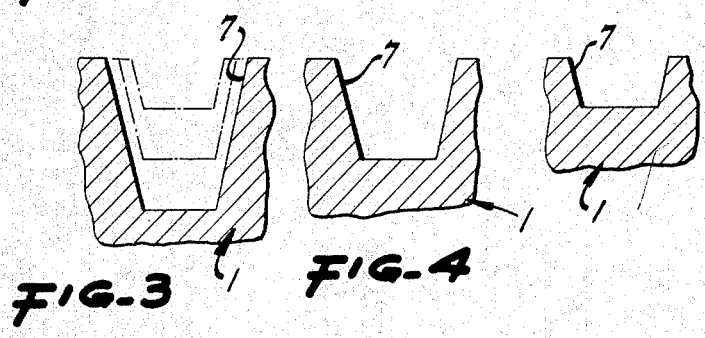

As noted from FIGS. 3 through 5, the cross-sectional configuration of the grooves 7 formed in the illustrated embodiment of the bar is generally trapezoidal in contour defined by a generally flat bottom and tapered side walls. It should be evident, however, that other groove cross-sectional configurations may be utilized, such as circular, elliptical, triangular, or square. In a milling manufacturing process of the type described hereinafter, pre-selected groove cross-sectional configuration may be easily accomplished by choosing a cutting tool having a cutting edge of the desired configuration to meet a particular need.

It is an important aspect of this invention that the respective grooves are formed with non-uniform dimensions from one end thereof to the other. That is, each groove 7 at its end which opens onto channel 3 is larger in cross-section than it is at its opposite end where it opens onto the edge surface 4 of the bar. Such dimensional variance is effected by forming each groove with a depth and width which progressively decreases from its end adjacent channel 3 to its end adjacent the bar edge surface 4. Such dimensional variation imparts a generally nozzle shaped configuration to each groove which adapts the same for effective use in a fluid bearing track structure well adapted for supporting and transporting articles in the manner described in the aforementioned application.

Each nozzle shaped groove preferably curves gradually and continuously from channel 3 to the bar edge 4. In that connection, in the embodiment illustrated in which the bars shown are formed by the grooving process to be described, each curved groove is formed generally as a segment of an ellipse. However, it should be understood that other geometrical configurations for the grooves may be utilized also, such as arcs of circles and the like.

With bars of the type illustrated, the exit angle of each groove, measured with respect to the plane of edge surface 4 of the bar, is relatively small. As seen in FIG. 2, such grooves exit generally tangentially with respect to the plane of bar edge 4. In that regard, however, it should be understood that the groove exit angle may be varied within wide predetermined limits with the relatively small exit angles shown being preferred because of the substantial directional increment imparted thereby to the fluid emanating therefrom for effectively supporting and moving articles to be carried across the bar edge 4. Exit angles within the range of approximately 1° to approximately 25° have been found suitable for most article handling and transporting functions, although larger exit angles up to or exceeding 90° also may be provided if required for particular purposes. The exit angle chosen will be selected in accordance with the type and configuration of the articles to be transported, their weight and size the pressure of the supporting fluid to be utilized, and like factors.

Reference is now directed to FIGS. 1 and 7 through 10 for an illustration of an improved process for forming grooves of the type noted in a bar. It is an important feature of such process that it is capable of forming grooves in only surface 2 without grooving surface 6 when a bar of the type shown in FIG. 1 is being manufactured. Such surface grooving selectivity is made possible by the particular orientation of the axis of rotation of the cutter utilized as will be described hereinafter.

A rotary cutter of the type well suited for forming the subject grooves is illustrated by way of example in FIG. 10 and is designated 11. Such cutter has an offset cutting point or edge 12 the configuration of which determines the cross-sectional contour of the respective grooves to be formed in a given bar. Cutting edge 12 in the cutter illustrated is generally trapezoidal in configuration to form each groove 7 with the generally flat bottom and inwardly converging side walls shown in FIGS. 3 through 5. As previously noted, other forms of cutter edges also may be employed if preferred.

It should be understood that cutter 11 may be mounted in a milling machine for rotation at preselected speeds and about variable axes of rotation in accordance with the results desired for a given grooving job. The subject grooving process is readily effected by utilizing a fly cutting technique on such a vertical milling machine. In that regard, the bar 1 to be grooved is positioned and clamped to the automatic feed table of the machine which is advanced longitudinally along a predetermined linear path at a continuous preselected speed.

Referring to FIG. 1, the axis of the path of movement of the bar through the milling machine is designated by arrow 16. By using a milling machine, quantities of grooved bars may be readily and very inexpensively produced by relatively unskilled labor. Importantly, the subject process permits the formation of curved, tapered nozzle shaped grooves having selectively variable exit angles as described previously.

As noted from FIGS. 1, 8 and 9, the axis of rotation of cutter 11 is inclined in a predetermined manner. That is, such axis of rotation, designated 19, is tilted at a predetermined angle of inclination relative to the vertical, designated by numeral 18 in such figures. In the illustrated procedure, such inclination is effected in the same direction as the axis of movement 16 along which bar 1 is transported. Additionally, it has been found highly desirable also to incline the axis of rotation 19 at a predetermined angle in a direction generally transverse of the axis 16 of the path movement of the bar. Such transverse inclination of axis of rotation 19 is illustrated in FIG. 1 with respect to reference line 17 which lies in the same plane as vertical reference line 18 but is inclined forwardly thereof. In that connection, it will be noted that the cutter axis is inclined laterally in a direction towards channel 3 formed in the bar being grooved, for the purpose to be described.

Thus, it will be understood that the axis of rotation 19 of the cutter incorporates therein both forward tilt as well as the transverse or lateral tilt as described.

Referring to FIG. 7, it should be noted that if the cutter were rotated about an upright axis cutter edge 12 would define a generally circular path in a horizontal plane as indicated by dotted line 21 in such figure. However, because of the inclination of the axis of rotation 19 of the cutter in the manner described, the path of rotation in a horizontal plane defined by cutter edge 12 is generally elliptical in configuration as noted by dotted line 22 in FIG. 1. If the bar being cut were maintained stationary during the successive periods of engagement therewith by the cutter edge, segments of an ellipse would be formed in the bar surface. By progressively and continuously moving the bar during rotation of the cutter, the generally elliptical configuration of the grooves cut in the bar surface may be selectively modified as desired to meet a particular need.

The forward tilt of the axis of rotation of the cutter permits cutter edge 12 to rise above and clear surface 2 rearwardly of the grooves previously formed so that all grooves formed extend in the same orientation as noted in FIG. 1. That is, the cutter edge, because of the tilt of the axis of rotation, engages surface 2 during only a portion of each revolution of the cutter.

The transverse tilt of the axis of rotation of the cutter produces grooves of decreasing depth and width as previously noted. That is, the lateral tilt of the axis of rotation causes cutter edge 12 to cut more deeply into the bar adjacent channel 3 and gradually to rise upwardly relative to the surface 2 as the cutter approaches the edge surface 4 of the bar. Thus, the tapered width and depth noted is automatically effected. The amount of such taper may be selectively varied by altering the degree of transverse tilt of the cutter.

By properly positioning the axis of rotation 19 of the cutter relative to bar surface 2, assurance can be given that the cutter edge will not engage the surface 6 on the opposite side of channel 3, thereby insuring that grooves will be formed only in surface 2 where they are preferred.

It should be understood from FIG. 7 that longitudinal movment of the bar during rotation of the cutter produces an elliptical cut of different configuration than if the bar were temporarily held stationary during cutting. By modifying the speed of movement of the bar relative to the speed of rotation of the cutter, or by moving the center of rotation laterally to the right or left from the point indicated in FIG. 7, the elliptical contour of the grooves may be increased or decreased selectively, thereby also increasing or decreasing the exit angle for the respective grooves relative to edge surface 4 of the bar. In the illustrated embodiment, the axis of rotation of the cutter is positioned, and the relative speeds of rotation and movement of the cutter and the bar are selected, so that the exit angle of the grooves is very small. Such grooves open generally tangentially to the edge 4 of the bar in the illustrated showing.

It has been found preferable to position the axis of rotation of the grooving tool closely adjacent the edge 8 of channel 3, that is, just inside such edge, and to utilize a tool boring a diameter twice the size of the width of the surface 2 being grooved. The drawings show the preferred relationship of the tool to the bar being grooved in illustrated fashion only and are not intended to be dimensionally accurate in that regard.

While it is preferred to move the bar continuously in the manner described, it should be understood alos that the bar may be moved in increments timed with the rotation of the cutter. That is, if desired the bar may be held stationary during the time when the cutter point is actually engaged with and grooving the surface 2 of the bar. Such procedure is somewhat less desirable than that noted previously but could be employed for special purposes and in a modified procedure, such as when a grinding tool is employed.

As already noted, the degree of tilt imparted to the axis of rotation of the cutter may be varied to produce a given result. However, by way of example, inclinations of 2.5° in the forward direction and in the transverse direction have been found effective for producing bars suitable for many needs.

FIG. 11 illustrates one examplary installation in which a grooved bar of the type described may be utilized as part of a fluid bearing track structure. In that regard, grooved bar 1 is held in engagement with a flat back up bar 26 by means of a headed bolt 27 extending through the respective bars. Channel 3 in bar 1 is operatively connected with an air plenum (not shown) or other source of bearing fluid so such fluid may pass through the channel and then upwardly through the respective curved grooves 7 into engagement with articles to be supported on the edge surface 4 of bar 1 and the corresponding aligned edge surface 28 of back up bar 26. The arrangement shown in FIG. 11, is merely illustrative and various other arrangements are contemplated to take full advantage of the novel construction of the grooved bars described herein.

It should be understood that by altering and preselecting the variable factors noted previously that curved grooves of generally uniform configuration but having preselected curved contours ranging from arcs of circles to exaggerated segments of ellipses may be provided, and to define exit angles selectable within wide predetermined limits, so that bars capable of meeting widely varying needs may be produced.

Having thus made a full disclosure of this invention, reference is directed to the appended claims for the scope of protection to be afforded thereby.

I claim:
1. A fluid bearing track structure or the like, comprising
A. a grooved bar having a generally planar surface,
B. a series of spaced generally uniform grooves in said surface,
 1. said grooves being curved and extending across said surface,
 2. each said groove being larger at one end thereof than at its other end, whereby such groove is generally in the configuration of a curved nozzle, and
C. a back up bar engaged with said grooved bar in contact with said surface and closing off said grooves therein except at said ends thereof, whereby fluid introduced into each of said grooves through said one end thereof may pass therethrough and emanate from said other end thereof.

2. The track structure of claim 1 in which
3. each said groove in said grooved bar has a width which progressively decreases from one edge of said surface toward the other edge thereof.
3. The track structure of claim 1 in which
3. each said groove of said grooved bar has a depth which decreases progressively from one edge of said surface toward the other edge thereof.
4. The track structure of claim 1 in which
3. each said groove of said grooved bar decreases progressively in both width and depth from one edge of said surface toward the other edge thereof.

5. The track structure of claim 1 in which
3. each said groove of said grooved bar opens onto said other edge of said bar at an exit angle relative thereto within a range of approximately 1° to approximately 25°.
6. The track structure of claim 1 in which
3. each of said grooves of said grooved bar opens onto said other edge of said bar generally tangentially thereof.
7. The track structure of claim 1 in which
3. each said groove of said grooved bar is formed generally as the segment of an ellipse.
8. The track structure of claim 1 which also includes D. a channel extending longitudinally of said grooved bar generally from one end to the other end thereof,
1. said channel defining one edge of said surface in which said grooves are formed,
2. said back up bar in contact with said surface closing off said channel and defining a fluid passing therewith.
9. The track structure of claim 1 which also includes D. a channel extending longitudinally of said grooved bar generally from one end to the other end thereof one side of which defines one edge of said surface, and
E. another generally planar surface extending along another side of said channel,
1. said last mentioned surface being free of grooves,
2. said back up bar in contact with said surface closing off said channel and defining a fluid passage therewith.

* * * * *